United States Patent Office 3,849,463
Patented Nov. 19, 1974

3,849,463
PREVENTION OF SILICA PORE OBSTRUCTION IN CRYSTALLINE ALUMINOSILICATES
Francis G. Dwyer, West Chester, Pa., and Pochen Chu, Woodbury, N.J., assignors to Mobil Oil Corporation
No Drawing. Continuation-in-part of abandoned application Ser. No. 886,400, Dec. 18, 1969. This application Dec. 11, 1972, Ser. No. 313,717
Int. Cl. C01b 33/28
U.S. Cl. 260—448 C     6 Claims

ABSTRACT OF THE DISCLOSURE

A method for synthesizing crystalline aluminosilicates having a $SiO_2/Al_2O_3$ ratio greater than 6 in which the tendency of silica to be occluded in or to be retained by the zeolitic structure is reduced by incorporation of an alkali metal salt containing monovalent anions in the synthesis mixture from which the aluminosilicate is crystallized.

CROSS-REFERENCE TO RELATED APPLICATION

This is a continuation-in-part of application Ser. No. 886,400, filed Dec. 18, 1969, now abandoned.

BACKGROUND OF THE INVENTION

Field of the invention

This invention relates to the preparation of crystalline aluminosilicates substantially free of occluded silica. More particularly, this invention relates to the inclusion of an alkali metal salt containing monovalent anions in a reaction mixture in which a crystalline aluminosilicate is formed which alkali metal salt is affected to prevent or reduce the amount of silica occluded within the porous crystalline aluminosilicate so synthesized.

Discussion of the prior art

Crystalline aluminosilicates are synthesized, generally speaking, from a reaction mixture comprising mixtures of oxides including sodium oxide, alumina, silica and water. Generally speaking, they are crystallized under alkaline conditions. After a gel is formed, the gel is allowed to remain in the presence of a mother liquor until the material crystallizes in the presence of the mother liquor. It is subsequently removed, washed until the pH of the filtrate becomes constant, and dried. It has been found that some preparations of crystalline aluminosilicates, especially those with $SiO_2/Al_2O_3$ ratio above 6, contain a substantial amount of occluded silica which impairs its subsequent base exchange into a more catalytically-active form as well as its ultimate catalytic activity and adsorption capacity. Soluble silicates which may become entrained within the pores of the zeolites present special problems. If the zeolite is subsequently contacted with a rare earth chloride solution to prepare a rare earth exchanged form, the occluded silicates will be converted into a rare earth silicate which, in subsequent use in catalytic cracking, has a high tendency to form coke and thus decrease the overall selectivity of the cracking catalyst. Generally speaking, the occluded silica prevents or impairs the full ion exchange of the material because it blocks certain exchange sites from the incoming exchanging cations. It has, thus, become desirable to provide a means whereby these crystalline aluminosilicate zeolites can be synthesized in a form in which occluded silica formation within the porous structure is substantially diminished. It has also become desirable to provide a treatment of already formed zeolites to remove occluded silica therefrom. Such a process is particularly desirable to users of zeolites who purchase zeolites from others who synthesize the same.

SUMMARY OF THE INVENTION

Broadly, this invention contemplates a method for decreasing silica occlusion in crystalline aluminosilicates possessing $SiO_2$ to $Al_2O_3$ ratio greater than 6. The method comprises incorporating an alkali metal salt containing monovalent anions in the aluminosilicate synthesis reaction mixture at a pH of at least 7 and preferably above 9.

DESCRIPTION OF SPECIFIC EMBODIMENTS

In a particularly desirable embodiment, this invention contemplates a method of synthesizing a crystalline aluminosilicate zeolite in which the reaction mixture contains an alkali metal salt containing monovalent anions in an amount exceeding the stoichiometric requirements of the reaction mixture and sufficient to prevent silica occlusion.

In another embodiment, this invention contemplates introducing into a crystalline aluminosilicate reaction mixture mother liquor in the presence of a gel forming crystalline aluminosilicate zeolite, an alkali metal salt containing monovalent anions in an amount sufficient to prevent silica occlusion.

The present invention offers a means of improving the activity and selectivity of catalytic forms of the crystalline aluminosilicate by the removal of occluded silica. Occluded silica impairs catalytic activity and selectivity by making catalytic sites unavailable to the reactants, by increasing the resistance to mass transfer of reactants and products in and out of the crystalline aluminosilicate and by increasing the tendency of forming undesirable products on or within the crystalline aluminosilicate during subsequent ion exchange procedures.

It has been discovered that the techniques of this invention for eliminating occluded silica are most effective, from the catalytic point of view, when the $SiO_2/Al_2O_3$ ratio of the crystalline aluminosilicate is greater than 6. Crystalline aluminosilicates with $SiO_2/Al_2O_3$ ratio above 6, such as ZSM–4 and ZSM–5, show a large appreciation in catalytic activity when comparing identical preparations with and without salt addition. Similar experiments with faujasites showed no appreciation with added salt in the reaction mix in terms of catalytic activity.

Similarly, the dynamic as well as the equilibrium adsorption properties will be enhanced by the elimination of occluded $SiO_2$ which makes unavailable surface area or adsorption sites in the crystalline aluminosilicate and obstructs the pore openings so that the rate the adsorbate is adsorbed within the crystalline aluminosilicate is reduced.

The present invention has several interesting ramifications. It has been discovered that by treating a crystalline aluminosilicate which has been separated from the mother liquor and washed with a mild solution of a specific salt of the type listed above that occluded silica can be removed and that the filterability of the material can be substantially improved. A preferred method of carrying out the present invention resides in introducing the salt into the reaction mixture prior to gel formation via one of the forming solutions. In this instance, the presence of the salt acts to prevent the occlusion of silica within the eventual crystal structure of the zeolite material. In another embodiment, of a particularly desirable type, the salt is introduced into the crystallization forming mixture, i.e. into the mother liquor in the presence of the cogelled silica alumina mixture, which, upon time and temperature, will crystallize into the desired crystalline aluminosilicate zeolite.

The technique of the present invention, denominated "salting," is very effective in increasing the rate of filtration of zeolite slurries as well as the ease by which soluble impurities are removed by washing. The technique is effective both when the salt is added to the initial crystallization reaction mixture as well as to a slurry of the crystallized zeolite. When salt is added to a sodium ZSM-4 reaction mixture, the filtration rate is observed to be more than double with definite improvements in the handling properties of the filter cake. These improvements in the handling properties of the material are especially important in ion exchanging large batches of the material as in plant operations. Salt added to a sodium Y zeolite slurry is also observed to double the filtration rate observed when no additive is present. The rate of filtration is 50 percent higher than that observed when an organic flocculant is employed for the same purpose. Furthermore, there is a very definite reduction in the time necessary to wash out the water soluble impurities.

The pH of the solution employed for a close treatment of the filtered crystalline aluminosilicate after it has been removed from the mother liquor should be above 7 and preferably above 9. If the pH is too high, generally above about a 1 normal solution, substantial destruction of the crystalline aluminosilicate will occur. If, on the other hand, the pH is too low, i.e. below 7, there will be no appreciable removal of occluded silica and there may be a risk of destroying the crystalline aluminosilicate.

When operating such a system, it is generally preferred that the amount of added salt to the crystallization reaction mixture be greater than 10 percent of the weight of solid crystalline aluminosilicate in the slurry.

It is further contemplated in this invention that the addition of alkali metal salts containing monovalent anions to the crystalline aluminosilicate synthesis reaction mixture to reduce silica occlusion also include mixtures of alkali metal salts containing monovalent anions provided the composition of the mixture does not disrupt the cation balance in the crystallized product, change the species of the crystallized product from that desired or prevent crystallization of a crystalline aluminosilicate.

Zeolites which can be treated in accordance with the methods of the present invention are the synthetic zeolites. These include zeolites L, T, alpha, beta, mordenite, synthetic offretite, synthetic erionite, ZSM-4, ZSM-5 and other synthetic zeolites with $SiO_2/Al_2O_3$ ratio greater than 6. These zeolites having an average pore size of between about 5 and 15 Angstroms benefit particularly by the present invention since the effect of occluded silica on these zeolites can be to render the substance appreciably nonporous. Once the porosity is improved by the removal of the occluded silica, the zeolites can be converted into a form where they can be suitable for catalysis.

The alkali metal salts for use in the present invention may be of several different kinds. Non-limiting examples of such salts are lithium nitrate, potassium nitrate, sodium nitrate, lithium halide (e.g. fluoride, chloride and bromide), potassium halide, sodium halide and mixtures of one with the other.

In order to more fully illustrate the nature of the present invention and the manner of practicing the same, the following examples are presented:

Example 1

In order to illustrate the enhancement in catalytic activity brought about by the reduction of silica occlusion, four ZSM-4 samples were synthesized differing only in the amount of sodium chloride added to the reaction mixture.

The basic method of formulation was that 180 grams of Georgia Kaolin, calcined 6 hours at 1700° F., was added to a solution containing 361 grams of Q-brand sodium silicate (28.5 wt. percent $SiO_2$, 8.8 wt. percent $Na_2O$ and 62.7 wt. percent $H_2O$), 60 grams of NaOH (98.2 percent NaOH) and 69 grams of a 50 percent weight percent water solution of tetramethylammonium chloride. In the preparations using added sodium chloride, the salt was added to the solution prior to the clay addition. After thorough mixing on a Waring Blendor, the mixture was transferred to a polypropylene jar placed into a steam chest at 100° C. to crystallize. After crystallization to ZSM-4 was apparently complete, the material was removed from the steam chest, washed free of excess alkali and untreated soluble silicates, and dried at 120° C. The dried samples were then given six 1 hour ion exchanges at 180–200° F. using 500 grams of 10 weight percent $NH_4Cl$ solution per 50 grams of solid sample. The samples were then washed chloride free, dried at 120° C., and calcined for 1 hour at 1000° F. in 5 percent oxygen atmosphere saturated with water vapor.

Four samples were prepared in this manner with 0, 20, 40 and 60 grams, respectively, of sodium chloride incorporated into the reaction mixture. The catalysts so prepared were evaluated for catalytic activity using the low temperature toluene disproportionation test, LTD, described below. The catalytic activities shown in the following table clearly indicate the enhancement in catalytic activity brought about by the reduction of silica occlusion by adding salt to the zeolite synthesis reaction mixture.

EFFECT OF "SALTING" ON HZSM-4 CATALYTIC ACTIVITY

| NaCl in reaction mixture, g | 0 | 20 | 40 | 60 |
|---|---|---|---|---|
| LTD activity $k_1$, l./mole-sec. $\times 10^3$ | 2.4 | 60 | 49 | 82 |

Example 2

To still further illustrate the improvement in catalytic activity resulting from a reduction in silica occlusion of crystalline aluminosilicates, two samples of ZSM-5, a highly siliceous crystalline aluminosilicate having $SiO_2/Al_2A_3$ ratio >50, were prepared. ZSM-5 is described in Belgium Pat. 713,576 of Oct. 11, 1968. One sample contained added NaCl in the zeolite synthesis reaction mixture while the other preparation did not. In all other respects, the preparations were identical.

The formulation and preparation of these samples were as follows: A silicate solution was prepared containing 44.7 pounds of Q-brand sodium silicate (28.5 wt. percent $SiO_2$, 8.8 wt. percent $Na_2O$ and 62.7 wt. percent $H_2O$), 5.6 pounds of tetrapropylammonium bromide and 84 pounds of water. To this was added a sodium aluminate solution containing 0.56 pounds of sodium aluminate (41.8 percent $Al_2O_3$, 33.5 percent $Na_2O$) and 14 pounds of $H_2O$. To this mixture was added a sulfuric acid solution containing 4.47 pounds of $H_2SO_4$ (97 percent) and 14.0 pounds of water. For the sample containing added salt, a solution of 16.7 pounds of NaCl and 20 pounds of water was added at this point in the preparation. After thorough mixing, the mixture was heated to 200–212° F. and held at this temperature until crystalline to ZSM-5 was apparently complete. The samples of the crystalline aluminosilicate were then separated from the mother liquor and washed free of excess alkali and soluble silicates. The crystalline aluminosilicates were then dried and calcined 10 hours at 1000° F. in air. After calcination, the zeolite samples were ion exchanged, given 4 contacts at room temperature with a 5 weight percent $NH_4Cl$ solution using 20 pounds of solution per pound of zeolite. The crystalline aluminosilicates were washed free of chloride, dried and then recalcined for 10 hours at 1000° F. in air.

Both samples of ZSM-5 were then evaluated for catalytic activity employing n-hexane cracking in the "alpha" test. The "alpha" test is described by P. B. Weisz and J. N. Miale in "Journal of Catalysis," Volume 4, No. 4, August 1965, pp. 527–9. The results of this evaluation, shown in the following table, again demonstrate the improved catalytic activity resulting when silica occlusion is reduced by the incorporation of an added salt to the zeolite synthesis reaction mixture.

EFFECT OF "SALTING" ON HZSM-5 CATALYTIC ACTIVITY

| | | |
|---|---|---|
| NaCl in reaction mixture, pounds | 0 | 16.7 |
| n-Hexane, α at 800° F | 480 | 620 |

Example 3

In order to illustrate that the enhancement of catalytic activity due to the reduction of silica occlusion is most effective with crystalline aluminosilicates having a $$SiO_2/Al_2O_3$$

rato greater than 6, two samples of faujasite were prepared by identical techniques differing only in that NaCl was added to the reaction mixture of one sample.

The basic method of formulation was that 30 grams of Georgia Kaolin, calcined 6 hours at 1700° F., was blended with 150 grams of Georgia Kaolin calcined 6 hours at 1500° F. This dry mixture was slowly added to a solution containing 75 grams of NaOH (98.2 percent NaOH), 361 grams of Q-brand sodium silicate and 69 grams of 50 weight percent solution of tetramethylammonium chloride in water while being agitated on a Waring Blendor. After the clay had been added, the mixture was continued for 30 seconds. The mixture was transferred to a polypropylene jar and put into a steam chest at 100° C. to crystallize. After 115 hours the sample was removed, a portion was washed free of the mother liquor and dried. X-ray diffraction analysis of the dried product determined the product to be synthetic faujasite.

An identical preparation was made differing only in that 60 grams of NaCl were added to the zeolite synthesis reaction mixture. The crystallized product of this preparation was also identified as faujasite.

Both samples were washed free of excess alkali and soluble silicates and dried at 120° C. The dried samples were then given four 1 hour rare earth ion exchanges at 180 to 200° F. using 400 grams of 8 percent.

$$RECl_3 \cdot 6H_2O$$

solution per 100 grams of dried zeolite. The samples were then washed chloride free, dried at 120° C. and calcined 3 hours at 1000° F. in dry air.

Both catalysts were then evaluated for catalytic activity employing the same n-hexane "alpha" test. The results of this test along with the comparison of the catalytic activities of higher $SiO_2/Al_2O_3$ ratio crystalline aluminosilicates, with and without salt addition to the zeolite synthesis reaction mixture, are presented in the following table. The results clearly demonstrate that the reduction of silica occlusion is much more effective in increasing catalytic activity of the higher $SiO_2/Al_2O_3$ ratio (>6) zeolites than with lower $SiO_2/Al_2O_3$ ratio zeolites such as faujasite.

EFFECT OF "SALTING" ON VARIOUS $SiO_2/Al_2O_3$ RATIO ZEOLITES

| Crystalline aluminosilicates | $SiO_2/Al_2O_3$ | Salted | Catalytic activity α at 800° F. | LTD K₁, l./mole-sec. ×10⁶ |
|---|---|---|---|---|
| ZSM-4 | 6.7 | No | | 2.4 |
| | | Yes | | 82 |
| ZSM-5 | >50 | No | 480 | |
| | | Yes | 620 | |
| Faujasite | 4.5-5.0 | No | 200 | |
| | | Yes | 100 | |

The slight differences in "alpha" for faujasite can be accounted for by the fact that the salted preparation had a slightly higher sodium content after rare earth exchange which would tend to lower its catalytic activity.

Example 4

In order to illustrate the actual filtration and washing improvements of a zeolite designated ZSM-4 and described hereinbelow, two samples of this ZSM-4 were synthesized, one batch containing 7.5 weight percent, based on the reaction mixture, of added sodium chloride in the reaction gel before the crystallization. A filter leaf study was conducted on the as synthesized form of the sodium ZSM-4 which existed as a slurry in its mother liquor. The slurry concentrations varied between 8.3 and 8.6 percent by weight after adjusting with water. The equipment and procedure for conducting the filter leaf tests are in accordance with that presented in the "Chemical Engineer's Handbook," Fourth Edition edited by Perry, Chilton and Kirkpatrick, pgs. 19–59. A filter leaf having an area of 0.1 square foot in size was employed. The filter leaf was a nylon cloth. In all experiments reported below, eighteen inches of vacuum was applied with a 40 seconds submergence for cake deposition and then 80 seconds for the dewatering in the atmosphere. The weight of filtrate and solids collected are shown in Table 1. The higher numbers for the runs wherein the sodium chloride was employed in the reaction mixture indicate that a greater amount of slurry was filtered. This is due to the better filterability of the material due to the flocculating effect of the salt on the dispersed crystalline alumino-silicate. Thus, the filter media, i.e. the nylon cloth and the deposited ZSM-4 zeolite is substantially more porous than those samples wherein no added salt was employed during crystallization and formation of the zeolite. The results reported below show that the slurries that contain sodium chloride have a much higher rate of filtration, especially at higher temperatures around, for instance, 160° F. At the outset, it should be noted that the physical properties of the filter cakes collected also show great differences. Those preparations wherein no sodium chloride was added resulted in a filter cake thus described as thioxtropic as usual, i.e. they were generally a dense phase. The preparations employing sodium chloride resulted in a firm, but porous, mass which was easy to handle in subsequent operations. The substantially lower water content of the filter cake resulting from the preparation employing the "salting" technique of the present invention is also advantageous.

TABLE 1
[Filter leaf studies on ZSM-4 filtration]

| NaCl | None | | 7.5% wt. | |
|---|---|---|---|---|
| Temp. (° F.) | R.T. | 152 | R.T. | 152 |
| Time of filtration: | | | | |
| In slurry (sec.) | 40 | 40 | 40 | 40 |
| Dry (sec.) | 80 | 80 | 80 | 80 |
| Filtrate¹ (gm.) | 141.6 | 235.5 | 292.2 | 666.6 |
| Wet cake¹ (gm.) | 64.2 | 99.2 | 67.1 | 135.9 |
| Solids in cake (gm.) | 30.5 | 48.9 | 37.1 | 80.7 |
| Thickness of cake (inch) | ⅛ | 3/16 | 3/16 | 7/16 |
| Solids content of cake, percent wt | 47.5 | 49.3 | 55.4 | 59.5 |
| Note | Thixotropic cake | | Firm and porous | |

¹ Average value of triplicate determinations.

Example 5

A solution containing 1266 g. of Q-brand sodium silicate and 1584 g. of $H_2O$ was mixed with a solution containing 40.5 g. $Al_2(SO_4)_3 \cdot 14H_2O$, 106 g. $H_2SO_4$, 157 g. of tetrapropylammonium bromide and 2166 g. $H_2O$ with agitation. The resultant gel was divided into four equal parts. To one, part A, 200 cc. of $H_2O$ was added, to the second, part B, 240 g. of KBr and 200 cc. of $H_2O$ was added, to the third, part C, 172 g. $NaNO_3$ and 200 cc. of $H_2O$ was added and to the fourth part, part D, 85.5 g. of LiCl and 200 cc. of $H_2O$ was added. All four portions were put in polypropylene jars and placed in a steam chest to crystallize at 100° C. After 92 hours, part A had crystallized to 90 percent ZSM-5; after 19 days, part B had crystallized to 90 percent ZSM-5; after 19 days, part C had crystallized to 100 percent ZSM-5; and after 25 days, part D had crystallized to 110 percent ZSM-5. All four samples were washed free of soluble salts, dried, precalcined 3 hours at 1000° F. in flowing $N_2$ and ion exchanged with ammonium nitrate until the sodium content <0.05 percent wt. All four samples were then dried and calcined 3 hours at 1000° F. in air. After calcination to activate the catalysts all four samples were evaluated in the M-forming screening test, described hereinafter. The results of the evaluations are shown below:

| Catalyst | A | B | C | D |
|---|---|---|---|---|
| Added salt | None | KBr | $NaNO_3$ | LiCl |
| M-forming eval.: | | | | |
| n-$C_7$ conv., percent wt | 7.3 | 62.8 | 50.4 | 38.6 |
| $C_6H_6$ conv., percent wt | | 23.6 | 17.9 | 12.5 |
| $C_7+$ aromatics, percent wt | 1.9 | 24.5 | 19.9 | 14.8 |

Example 6

A mixture, mixture A, containing 180 g. of Georgia kaolin, calcined 6 hours at 1700° F. 361.05 g. Q-brand sodium silicate, 60 g. of NaOH, 69.4 g. of a 50 percent wt. solution of tetramethylammonium chloride and 100 g. of $H_2O$ was prepared by thoroughly blending in a Waring Blendor.

A second mixture, mixture C, was prepared in the same manner differing only in that 58.1 g. of $NaNO_3$ was incorporated into the mixture.

A third mixture, mixture D, was prepared in the same manner as mixtures A and C differing only in that 29.0 g. of LiCl was incorporated into the mixture.

All three preparations were put into polypropylene jars and placed in a steam chest to crystallize at 100° C. After 48 hours mixture A was 85 percent ZSM-4; after 72 hours mixture C was 105 percent ZSM-4; and after 96 hours mixture D was 85 percent ZSM-4.

All three samples were washed free of soluble salts then exchanged with $NH_4NO_3$ until the sodium content was <0.2 percent wt. The samples were then washed, dried and calcined one hour at 1000° F. in air.

All three samples were evaluated for catalytic activity using the LTD test. The results of the evaluation are shown below:

| Catalyst | A | C | D |
|---|---|---|---|
| Added salt | None | $NaNO_3$ | LiCl |
| k ×$10^5$, l./mol-sec | 0.5 | 9.9 | 5.5 |

LIQUID TOLUENE DISPROPORTIONATION TEST

The liquid toluene disproportionation test (LTD) used herein has been developed using a microreactor (less than 20 cc. of catalyst) and full size catalyst particles that give kinetically consistent data. The range of catalyst volumes and liquid flow rates employed are above the range where axial diffusion effects might be significant and below the range where bypassing, short circuiting or excessive backmixing could give erroneous results.

The apparent activation energy for liquid phase toluene disproportionation has been found to be 24 kcal./g. mole. The aging rate, i.e. the rate of decline of the second order reaction rate constant with time on stream, was found to be a first order decay with two distinct aging rates over a 24-hour period.

EXPERIMENTAL PROCEDURE

The experimental evaluations were conducted using a microreactor (15 cc. max. volume), reagent grade toluene (percolated through alumina). The operating procedure was to fill the complete reaction system with liquid at room temperature then raise the temperature to the operating temperature in 40 minutes or less. When the catalyst bed reached reaction temperature, this was taken as the reference to zero time. The product was continually collected over the course of the run, but only that product collected over the final five minutes of the time period specified was used for product analysis. That is to say that the product analysis reported for a sample after one hour on stream was for a sample taken for the time period 55-60 minutes.

The product analysis was performed by gas phase chromatography employing an F&M Model 5754 temperature programmed for 80 to 125° C. at 4° C./min. and using helium as a carrier gas at 50 cc./min. A 24-foot chromatographic column was employed packed with 4 percent diisodecaphthalate, 4 percent bentone 34 supported on 60 to 80 mesh Chromosorb W HMDS.

RESULTS AND DISCUSSION

The kinetic model used was for the reaction:

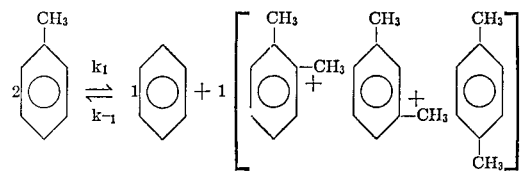

which is a second order reaction in toluene and assumes that all three xylenes behave as a single species. The integrated rate equation is readily derived or can be found in several reference texts. Employing the same equilibrium values for reactant and products reported, the following expression for the reaction rate constant, $k_1$, was obtained:

$$k_1 = \frac{1}{t}(.073 \ln 0.16)\left(\frac{3.62-X}{0.58-X}\right)$$

where $t$—residence time, sec.
$X$—toluene conversion, weight percent

M-FORMING SCREENING TEST

The M-forming screening test used herein has been developed to measure conversions of n-heptane and benzene, supplied as a charge in mixture with 50 wt. percent n-heptane and 50 wt. percent benzene. The $C_7+$ aromatics produced are also measured.

The above charge is brought in contact with a catalyst being evaluated in the test under conditions of 600° F., 400 p.s.i.g. and a 3:1 hydrogen:hydrocarbon ratio. Depending upon the catalyst used, residence time is varied by changing the weight hourly space velocity and holding the hydrogen-hydrocarbon ratio constant.

The general program used in this test is outlined as follows:

1. The reactor is loaded with test catalyst, purged and pressure tested.
2. The reactor temperature is brought to 600° F.
3. The above hydrocarbon mixture charge is advanced through the reactor under the above conditions.
4. On-line samples are taken and liquid recovery is examined.

The process of the present invention is particularly suitable in preparing composite catalysts comprising alumina and relatively new zeolites known as ZSM-4. ZSM-4 compositions in an anhydrous state can also be identified, in terms of mole ratios of oxides, as follows:

$$0.9\pm0.2 M_{\frac{2}{n}}O : Al_2O_3 : 6\text{-}20 SiO_2$$

wherein M is a cation and $n$ is the valence of said cation. In the as synthesized aluminosilicate form, the anhydrous zeolite has a formula, in terms of mole ratios of oxides, as follows:

$$0.9\pm0.2 M_{\frac{2}{n}}O : Al_2O_3 : 6\text{-}20 SiO_2$$

and M is selected from the group consisting of a mixture of tetramethylammonium cations and alkali metal cations, especially sodium. The original cations can be present so that the amount of tetramethylammonium cations is between 1 and 50 percent of the total amount of the original cations. Thus, the anhydrous zeolites can be expressed by the following formula, in terms of mole ratios of oxides:

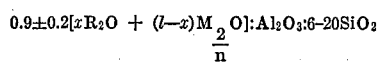

wherein R is tetramethylammonium, M is an alkali metal cation and $x$ is between 0.01 and 0.50.

Members of the family of ZSM-4 zeolites possess a definite distinguishing crystalline structure whose X-ray diffraction pattern has the following values:

TABLE 2

| Interplanar Spacing $d$(A): | Relative Intensity |
|---|---|
| 9.1±.2 | vs |
| 7.94±.1 | mw |
| 6.90±.1 | m |
| 5.97±.07 | s |
| 5.50±.05 | mw |
| 5.27±.05 | mw |
| 4.71±.05 | mw |
| 4.39±.05 | w |
| 3.96±.05 | w |
| 3.80±.05 | s |
| 3.71±.05 | m |
| 3.63±.05 | m |
| 3.52±.05 | s |
| 3.44±.05 | m |
| 3.16±.05 | s |
| 3.09±.05 | m |
| 3.04±.05 | m |
| 2.98±.05 | m |
| 2.92±.05 | s |

These values were determined by standard techniques. The radiation was the K-alpha doublet of copper, and a Geiger counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d(obs.), the interplanar spacing in A., corresponding to the recorded lines, were calculated. In Table 2, the relative intensities are given in terms of the symbols s=strong, m=medium, w=weak, mw=medium weak and vs=very strong.

Zeolite ZSM-4 can be suitably prepared by preparing a solution containing $R_2O$, sodium oxide, an oxide of aluminum, an oxide of silica and water and having a composition, in terms of mole ratios of oxides, falling within the following ranges:

TABLE 3

| | Broad | Preferred |
|---|---|---|
| Na₂O/(R₂O+Na₂O) | .31 to <1 | .75 to .99 |
| (R₂O+Na₂O)/SiO₂ | .05 to .90 | .15 to .75 |
| SiO₂/Al₂O₃ | 3 to 60 | 3 to 30 |
| H₂O/(R₂O+Na₂O) | 15 to 600 | 15 to 150 | wherein R is a tetramethylammonium cation and maintaining the mixture until crystals of the zeolite are formed. Thereafter, the crystals are separated from the liquid and recovered. ZSM-4 is preferably formed as an aluminosilicate.

The process of the present invention is also particularly suitable in preparing composite catalysts comprising alumina and relatively new zeolites known as ZSM-5. ZSM-5 compositions in anhydrous state can also be identified, in terms of mole ratios of oxides, as follows:

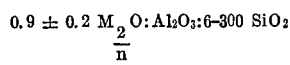

wherein M is a cation and $n$ is the valence of said cation. In a preferred synthesized form, the anhydrous zeolite has a formula, in terms of mole ratios of oxides, as follows:

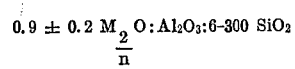

and M is selected from the group consisting of a mixture of alkali metal cations, especially sodium, and tetraalkylammonium cations, the alkyl groups of which preferably contain 2–5 carbon atoms.

Members of the family of ZSM-5 zeolites possess a definite distinguishing crystalline structure whose X-ray diffraction pattern shows the following significant lines:

TABLE 4

| Interplanar Spacing $d$ (A): | Relative Intensity |
|---|---|
| 11.1±0.3 | s |
| 10.0±0.3 | s |
| 7.4±0.2 | w |
| 7.1±0.2 | w |
| 6.3±0.2 | w |
| 6.04±0.2 | w |
| 5.97±0.2 | w |
| 5.69±0.1 | w |
| 5.56±0.1 | w |
| 5.01±0.1 | w |
| 4.60±0.1 | w |
| 4.35±0.1 | w |
| 4.25±0.1 | w |
| 3.85±0.1 | vs |
| 3.75±0.05 | s |
| 3.71±0.05 | s |
| 3.64±0.05 | m |
| 3.04±0.05 | w |
| 2.99±0.05 | w |
| 2.94±0.05 | w |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d(obs.), the interplanar spacing in A, corresponding to the recorded lines, were calculated. In Table 4, the relative intensities are given in terms of the symbols s=strong, m=medium, w=weak and vs=very strong.

Zeolite ZSM-5 can be suitably prepared by preparing a solution containing tetrapropylammonium hydroxide, sodium oxide, an oxide of aluminum, an oxide of silica and water and having a composition falling within the following ranges:

TABLE 5

| | Broad | Preferred | Particularly preferred |
|---|---|---|---|
| OH⁻/SiO₂ | 0.07–10.0 | 0.1–0.8 | 0.2–0.75 |
| R₄N⁺/(R₄N⁺ + Na⁺) | 0.01–0.95 | 0.02–0.90 | 0.02–0.80 |
| H₂O/OH⁻ | 10–300 | 10–300 | 10–300 |
| SiO₂/Al₂O₃ | >5 | 5–300 | 15–300 | wherein R is propyl and maintaining the mixture until crystals of the zeolite are formed. It is noted that an excess of tetrapropylammonium hydroxide can be used which would raise the value of OH⁻/SiO₂ above the ranges set forth supra. The excess hydroxide, of course, does not participate in the reaction. Thereafter, the crystals are separated from the liquid and recovered. Typical reaction conditions consist of heating the foregoing reaction mixture to a temperature of from about 75° C. to 205° C. for a period of time of from about one hour to 60 days. A more preferred temperature range is from about 90° C. to 175° C. with the amount of time at a temperature in such range being from about 1 hour to 20 days.

We claim:

1. A method of decreasing silica pore obstruction in crystalline aluminosilicates having a $SiO_2/Al_2O_3$ ratio greater than 6 which comprises admixing a crystalline aluminosilicate zeolite reaction mixture sufficient to prepare a crystalline aluminosilicate zeolite, said reaction mixture comprising the following components expressed as oxides in the mole ratios set forth:

| | |
|---|---|
| $Na_2O/(R_2O+Na_2O)$ | .31 to <1 |
| $(R_2O+Na_2O)/SiO_2$ | 0.5 to .90 |
| $SiO_2/Al_2O_3$ | 3 to 60 |
| $H_2O/(R_2O+Na_2O)$ | 15 to 600 | wherein R is a tetramethylammonium cation, with an alkali metal salt containing monovalent anions in an amount sufficient to decrease silica pore obstruction, and maintaining the mixture until crystals having the X-ray diffraction pattern values shown in Table 2 of the specification are formed.

2. A method according to Claim 1 wherein said mole ratios are as follows:

| | |
|---|---|
| $Na_2O/(R_2O+Na_2O)$ | .75 to .99 |
| $(R_2O+Na_2O)/SiO_2$ | .15 to .75 |
| $SiO_2/Al_2O_3$ | 3 to 30 |
| $H_2O/(R_2O+Na_2O)$ | 15 to 150 |

3. A method of decreasing silica pore obstruction in crystalline aluminosilicates having a $SiO_2/Al_2O_3$ ratio greater than 6 which comprises admixing a crystalline aluminosilicate zeolite reaction mixture sufficient to prepare a crystalline aluminosilicate zeolite, said reaction mixture comprising the following components in the mole ratios set forth:

| | |
|---|---|
| $OH^-/SiO_2$ | 0.07–10.0 |
| $R_4N^+/(R_4N^++Na^+)$ | 0.01–0.95 |
| $H_2O/OH^-$ | 10–300 |
| $SiO_2/Al_2O_3$ | >5 | wherein R is propyl, with an alkali metal salt containing monovalent anions in an amount sufficient to decrease silica pore obstruction, and maintaining the mixture until crystals having the X-ray diffraction pattern values shown in Table 4 of the specification are formed.

4. A method according to Claim 3 wherein said mole ratios are as follows:

| | |
|---|---|
| $OH^-/SiO_2$ | 0.1–0.8 |
| $R_4N^+/(R_4N^++Na^+)$ | 0.02–0.90 |
| $H_2O/OH^-$ | 10–300 |
| $SiO_2/Al_2O_3$ | 5–300 |

5. The method of Claim 1 wherein said salt is selected from the group consisting of lithium halide, potassium halide, sodium halide, lithium nitrate, potassium nitrate and sodium nitrate.

6. The method of Claim 3 wherein said salt is selected from the group consisting of lithium halide, potassium halide, sodium halide, lithium nitrate, potassium nitrate and sodium nitrate.

References Cited
UNITED STATES PATENTS

| | | | |
|---|---|---|---|
| 3,306,922 | 2/1967 | Barber et al. | 260—448 C |
| 3,642,434 | 2/1972 | Dwyer | 260—448 C |
| 3,702,886 | 11/1972 | Argauer | 423—328 |
| 3,314,752 | 4/1967 | Kerr | 423—328 |

FOREIGN PATENTS

| | | | |
|---|---|---|---|
| 1,903,204 | 10/1969 | Germany | 423—329 |
| 1,117,568 | 6/1968 | Great Britain | 423—328 |
| 1,074,130 | 6/1967 | Great Britain | 423—328 |

OTHER REFERENCES

Barber et al. "J. Chem. Soc." 1952, pp. 1561–1570.

EARL C. THOMAS, Primary Examiner

B. E. HEARN, Assistant Examiner

U.S. Cl. X.R.

208—111; 252—455 Z; 423—328